(12) United States Patent
Huber et al.

(10) Patent No.: US 12,412,210 B2
(45) Date of Patent: Sep. 9, 2025

(54) CONSOLIDATION OF DATA SOURCES FOR EXPEDITED VALIDATION OF RISK ASSESSMENT DATA

(71) Applicant: EQUIFAX INC., Atlanta, GA (US)

(72) Inventors: Theresa Huber, Ballwin, MO (US); Dileep John, St. Louis, MO (US); Balaji Mudduluri, Chesterfield, MO (US); Muhammad Arshad, Valley Park, MO (US); Kishore Kumar Katabathuni, Chesterfield, MO (US); Saratchandra Golla, O'Fallon, MO (US); Akshay Reddy Vontari, Irving, TX (US)

(73) Assignee: EQUIFAX INC., Atlanta, GA (US)

( * ) Notice: Subject to any disclaimer, the term of this patent is extended or adjusted under 35 U.S.C. 154(b) by 7 days.

(21) Appl. No.: 18/067,578

(22) Filed: Dec. 16, 2022

(65) Prior Publication Data
US 2023/0196455 A1  Jun. 22, 2023

Related U.S. Application Data

(60) Provisional application No. 63/265,609, filed on Dec. 17, 2021.

(51) Int. Cl.
G06Q 40/03 (2023.01)
(52) U.S. Cl.
CPC .................... *G06Q 40/03* (2023.01)

(58) Field of Classification Search
None
See application file for complete search history.

(56) References Cited

U.S. PATENT DOCUMENTS

| | | | |
|---|---|---|---|
| 11,410,230 B1* | 8/2022 | Olson | G06F 21/6245 |
| 11,562,078 B2* | 1/2023 | Sabourin | G06F 9/547 |
| 2020/0074100 A1* | 3/2020 | Raneri | G06F 16/248 |
| 2021/0194885 A1* | 6/2021 | Manna | G06F 16/13 |

* cited by examiner

*Primary Examiner* — Peter D Nolan
*Assistant Examiner* — Matthew Cobb
(74) *Attorney, Agent, or Firm* — Kilpatrick Townsend & Stockton LLP

(57) ABSTRACT

Systems and methods for consolidating data sources for expediting validation processes are described herein. A user interface can be provided to a first entity. First risk assessment data associated with the first entity can be received via the user interface. Second risk assessment data associated with the first entity can be received. The first risk assessment data and the second risk assessment data can be validated. The first risk assessment data and the second risk assessment data can be output for display on the user interface. A responsive message including the validated first risk assessment data and the validated second risk assessment data can be transmitted to a remote computing device for use in controlling access of the first entity to one or more interactive computing environments.

20 Claims, 6 Drawing Sheets

CONSOLIDATION OF DATA SOURCES FOR EXPEDITED VALIDATION OF RISK ASSESSMENT DATA

CROSS-REFERENCE TO RELATED APPLICATION

This application claims priority to provisional application No. 63/265,609 filed Dec. 17, 2021, entitled "CONSOLIDATION OF DATA SOURCES FOR EXPEDITED VALIDATION OF RISK ASSESSMENT DATA," the entirety of which is incorporated by reference herein for all purposes.

TECHNICAL FIELD

The present disclosure relates generally to risk assessment. More specifically, but not by way of limitation, this disclosure relates to consolidating data sources for expediting validation of risk assessment data.

BACKGROUND

Risk assessment can be performed by various computing devices. In some examples, risk assessment can involve analyzing data to determine a risk value. A computing device may be configured to analyze data and determine risk based on a single source of data or using a single process. But, in some cases, the single source of data may not provide accurate risk assessment input. Additionally, the computing device may not be configured to analyze more than the single source of data or execute more than a single process for performing the risk assessment.

SUMMARY

Various aspects of the present disclosure provide systems and methods for consolidating data sources for expediting validation processes. A user interface can be provided to a first entity. The user interface can include user interface elements corresponding to risk assessment indicators. First risk assessment data associated with the first entity can be received. Second risk assessment data associated with the first entity can be received from a second entity. The first risk assessment data and the second risk assessment data can be validated. The first risk assessment data and the second risk assessment data can be output for display on the user interface. A responsive message including at least the validated first risk assessment data and the validated second risk assessment data can be transmitted to a remote computing device for use in controlling access of the first entity to one or more interactive computing environments.

In other aspects, a system can include a processor and a non-transitory computer-readable medium that can include instructions that are executable by the processor to cause the processor to perform various operations. The system can provide a user interface to a first entity. The user interface can include user interface elements corresponding to risk assessment indicators. The system can receive, via the user interface, first risk assessment data that is associated with the first entity. The system can receive, based on the first risk assessment data and from a second entity, second risk assessment data that is associated with the first entity. The system can validate the first risk assessment data and the second risk assessment data. The system can output the first risk assessment data and the second risk assessment data for display on the user interface. The system can transmit, to a remote computing device, a responsive message including at least the validated first risk assessment data and the validated second risk assessment data for use in controlling access of the first entity to one or more interactive computing environments.

In other aspects, a non-transitory computer-readable medium can include instructions that are executable by a processing device for causing the processing device to perform various operations. The operations can include providing a user interface to a first entity. The user interface can include user interface elements corresponding to risk assessment indicators. The operations can include receiving, via the user interface, first risk assessment data that is associated with the first entity. The operations can include receiving, based on the first risk assessment data and from a second entity, second risk assessment data that is associated with the first entity. The operations can include validating the first risk assessment data and the second risk assessment data. The operations can include outputting the first risk assessment data and the second risk assessment data for display on the user interface. The operations can include transmitting, to a remote computing device, a responsive message including at least the validated first risk assessment data and the validated second risk assessment data for use in controlling access of the first entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
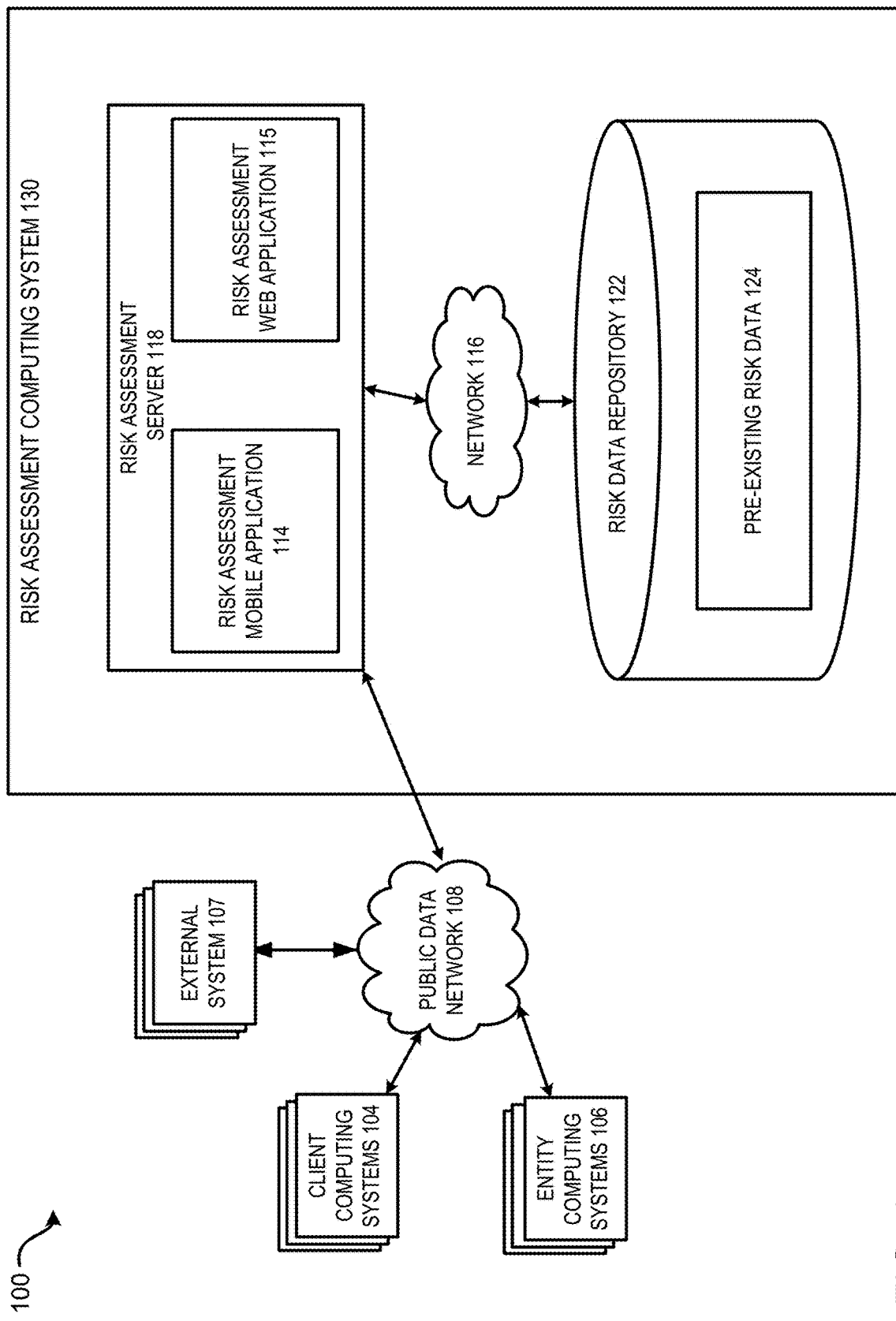
FIG. 1 is a block diagram depicting an example of an operating environment that includes a risk assessment computing system that can consolidate data sources for expediting validation of risk assessment data according to certain aspects of the present disclosure.

Various techniques using computing systems can be used to output various information. For example, a computing device or system can predict risk assessment values (e.g., risk scores associated with granting access to an online computing environment, or credit scores, etc.) with respect to one or more entities that can be used for making decisions about the entities. But, the risk assessment values may involve one or more validation processes. For example, a first entity (e.g., a user, a consumer, or other individual) may submit a first set of data (e.g., system configurations and computing resource usage for a computing system, asset, credit for an individual, or other suitable data) for validation, and a second entity (e.g., a host of the online computing environment, a financial institution or other suitable entity) can submit a second set of data (e.g., system configurations and computing resource usage of the computing system, assets financial records of the individual, etc.) for validation. Other computing systems may not be configured to validate both sets of data, or any additional received data, and may wait or otherwise delay the validation process until receiving validation of all data from separate computing systems. While this example is described with respect to two datasets, any suitable number of datasets, such as less than two or more than two, can be submitted for validation, and the other computing systems may not be able to validate the received data.

Certain aspects and features of the present disclosure that consolidate data sources for expediting validation processes with respect to risk assessment data can address one or more issues identified above. For example, a computing system can receive a set of risk assessment data from various sources and can validate the risk assessment data. The set of risk assessment data can include more than one risk assessment indicator or value, and the various sources can include an individual entity, a service provider, a government institution, or other suitable sources of the data. A risk assessment indicator or value can include a risk score, an asset ratio, a listing of assets, government records or information, other suitable risk assessment indicators, or a combination thereof. By consolidating the risk assessment data and validating the risk assessment data before initiating an interaction, such as requesting access to computational resources, etc., the computing system can change its configuration or computing resource usage, such as decreasing the amount of memory, processing power, network usage, or other resources used for the interaction and can make the interaction and validation process faster and more efficient.

In some examples, the computing system can provide a user interface for an entity. The user interface can include a set of user interface elements that can correspond to various risk assessment indicators. The user interface can include other suitable user interface elements such as user interface elements for allowing the entity to provide goals and other suitable information. A first risk assessment indicator can include a risk score, such as a credit score, a second risk assessment indicator can include an asset ratio, such as a debt-to-income ratio, and a third risk assessment indicator can include an amount of assets for completing an interaction, for example an amount of resources requested for granting access to an interactive computing environment, or the like. Other amounts and other types of suitable risk assessment indicators can be presented or otherwise displayed by the user interface. The user interface can include other suitable elements, information, etc., for display to the first entity or to other suitable entities.

The entity can interact with each user interface element for causing the computing system to receive risk assessment data. For example, the entity can interact with a first user interface element to provide risk assessment data for the first risk assessment indicator. In response to the entity interacting with the first user interface element, the computing system can provide a subsequent user interface to guide the entity to provide accurate and complete information for determining the risk assessment indicator. The entity can similarly interact with each user interface element for providing the computing system with accurate and complete information for determining each risk assessment indicator.

In some examples, interacting with one or more of the user interface elements can cause the computing system to communicate with separate computing systems. For example, the entity can interact with the user interface element corresponding to the third risk assessment indicator, and the computing system may provide a subsequent user interface to the entity that can allow the entity to login to a service-provider institution such as a bank, a data provider, or the like. Upon the entity logging into the service-provider institution, a token can be generated by the computing system that can be used to receive information from the service-provider institution. For example, the computing system can make an application programming interface (API) call to the service-provider institution and can use the token to receive data relating to the entity from the financial institution. The data can include an asset report or other suitable information associated with the entity and usable for determining the third risk assessment indicator. In some examples, the asset report can include a predefined format, and the computing system can extract information from the asset report that can be used to determine the third risk assessment indicator.

As described herein, certain aspects provide improvements to controlling access to computing resources. For example, validated risk assessment data can be used by a risk assessment system to more accurately and efficiently control access to computing resources such as an interactive computing environment that can provide computing resources, such as computational processing power, computer memory, storage resources, network resources, and the like, to the entity. In particular, data consolidation techniques can be used by the risk assessment system to more accurately (e.g., compared to systems using other techniques), and using fewer resources, validate risk assessment data. Based on the validated risk assessment data, the risk assessment system can more accurately and efficiently control access to the computing resources. Compared with other computational techniques, consolidating risk assessment data requires fewer computing resources (e.g., CPU times) and storage resource (e.g., memory usage) to validate risk assessment data. Further, the risk assessment data valuation presented herein can also reduce the amount of time used for the validation by consolidating data received from multiple resources and performing the validation without waiting for all the data becoming available.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Validation of Consolidated Risk Assessment Data Referring now to the drawings, FIG. 1 is a block diagram depicting an example of an operating environment 100 that includes a risk assessment computing system 130 that can consolidate data sources for expediting validation of risk assessment data. FIG. 1 depicts examples of hardware components of a risk assessment computing system 130, according to some aspects. The risk assessment computing system 130 can be a specialized computing system that may be used for processing large amounts of data using a large number of computer processing cycles. The risk assessment computing system 130 can include a risk assessment server 118 for validating risk assessment data from various sources. In some examples, the risk assessment computing system 130 can include other suitable components, servers, subsystems, etc.

The risk assessment server 118 can include one or more processing devices that can execute program code, such as a risk assessment mobile application 114, which can be used by a first entity such as a consumer or other suitable individual, or a risk assessment web application 115, which can be used by a second entity such as a provider of financial products or other suitable services. The program code can be stored on a non-transitory computer-readable medium or other suitable medium. The risk assessment mobile application 114 can execute one or more processes to present a user interface for receiving risk assessment data. The risk assessment server 118 can then perform risk assessment validation operations for validating the received risk assessment data, for example using other suitable modules, models, components, etc. of the risk assessment server 118. In some aspects, the risk assessment mobile application 114 can validate risk assessment data received from an entity and by utilizing pre-existing risk assessment data 124, which can include historical risk assessment data or other suitable data. The pre-existing risk assessment data 124 can be stored in one or more network-attached storage units on which various repositories, databases, or other structures are stored. Examples of these data structures can include the risk data repository 122.

Network-attached storage units may store a variety of different types of data organized in a variety of different ways and from a variety of different sources. For example, the network-attached storage unit may include storage other than primary storage located within the risk assessment server 118 that is directly accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory devices, or other suitable media.

Furthermore, the risk assessment computing system 130 can communicate with various other computing systems. The other computing systems can include client computing systems 104, entity computing systems 106, such as smartphones, personal computers, and the like, external resource 107, such as computing systems owned or operated by service-providers, financial institutions, and the like, and other suitable computing systems. For example, client computing systems 104 may transmit risk assessment queries, for example via the risk assessment web application 115, to the risk assessment server 118 for risk assessment, or may transmit signals to the risk assessment server 118 that control or otherwise influence different aspects of the risk assessment computing system 130. The risk assessment computing system 130 may also interact, for example via the risk assessment mobile application 114, with entity computing systems 106 via one or more public data networks 108 to facilitate interactions between users of the entity computing systems 106 and interactive computing environments provided by the client computing systems 104. In some examples, the risk assessment computing system 130 can provide a user interface to the entity computing system 106 for receiving risk assessment data from the first entity, and the risk assessment computing system 130 can transmit validated risk assessment data to the client computing system 104 for making decisions about the first entity. In some examples, the risk assessment computing system 130 can additionally communicate with the external resource 107, for example to receive additional risk assessment data, through the public data network 108.

Each client computing system 104 may include one or more third-party devices, such as individual servers or groups of servers operating in a distributed manner. A client computing system 104 can include any computing device or group of computing devices operated by a service provider, such as a seller, lender, or other suitable provider of products or services. The client computing system 104 can include one or more server devices. The one or more server devices can include or can otherwise access one or more non-transitory computer-readable media.

The client computing system 104 can further include one or more processing devices that can provide an interactive computing environment, such as a user interface, to perform one or more of the operations described herein. The interactive computing environment can include executable instructions stored in one or more non-transitory computer-readable media. The instructions providing the interactive computing environment can configure one or more processing devices to perform one or more of the operations described herein. In some aspects, the executable instructions for the interactive computing environment can include instructions that provide one or more graphical interfaces. The graphical interfaces can be used by an entity computing system 106 to access various functions of the interactive computing environment. For instance, the interactive computing environment may transmit data to and receive data, for example via the graphical interface, from an entity computing system 106 to shift between different states of the interactive computing environment, where the different states allow one or more electronics interactions between the entity computing system 106 and the risk assessment computing system 130 to be performed.

In some examples, the client computing system 104 may include other computing resources associated therewith, for example not shown in FIG. 1, such as server computers hosting and managing virtual machine instances for providing cloud computing services, server computers hosting and managing online storage resources for users, server computers for providing database services, and others. The interaction between the entity computing system 106 and the risk assessment computing system 130 may be performed through graphical user interfaces, such as the user interface, that can be presented by the risk assessment computing system 130 to the entity computing system 106, or through application programming interface (API) calls or web service calls, or through other suitable network communication techniques.

An entity computing system 106 can include any computing device or other communication device operated by a user or entity, such as a consumer or other suitable individual. The entity computing system 106 can include one or more computing devices, such as laptops, smartphones, and other personal computing devices. A entity computing system 106 can include executable instructions stored in one or more non-transitory computer-readable media. The entity computing system 106 can also include one or more processing devices that can execute program code to perform one or more of the operations described herein. In various examples, the entity computing system 106 can allow a user to access certain online services from a client computing system 104 or other computing resources, to engage in mobile commerce with a client computing system 104, to obtain controlled access to electronic content hosted by the client computing system 104, and the like.

The entity can use the entity computing system 106 to engage in an electronic interaction with a client computing system 104 via an interactive computing environment. The risk assessment computing system 130 can receive a request, for example from the client computing system 104, to determine risk associated with the entity and can use risk assessment values to determine and output the risk. An electronic interaction between the entity computing system 106 and the client computing system 104 can include, for example, the entity computing system 106 being used to request a financial loan, online computing resources, or other suitable services or products from the client computing system 104, and so on. An electronic interaction between the entity computing system 106 and the client computing system 104 can also include, for example, one or more queries for a set of sensitive or other controlled data, accessing online financial services provided via the interactive computing environment, submitting an online application, for example for online computing resources, to the client computing system 104 via the interactive computing environment, operating an electronic tool within an interactive computing environment hosted by the client computing system (e.g., a content-modification feature, an application-processing feature, etc.).

In some aspects, an interactive computing environment implemented through the client computing system 104 can be used to provide access to various online functions. As a simplified example, a user interface or other interactive computing environment provided by the client computing system 104 can include electronic functions for requesting computing resources, online storage resources, network resources, database resources, or other types of resources. In another example, a website or other interactive computing environment provided by a client computing system 104 can include electronic functions for obtaining one or more financial services, such as an asset report, management tools, credit card application and transaction management workflows, electronic fund transfers, etc. An entity computing system 106 can be used to request access to the interactive computing environment provided by the client computing system 104. The client computing system 104 can submit a request for risk assessment to the risk assessment computing system 130 and can selectively grant or deny access to various electronic functions based on the risk assessment performed by the risk assessment computing system 130. Based on the request, the risk assessment computing system 130 can collect or otherwise receive risk assessment data associated with the first entity and communicate with the risk assessment server 118 for risk assessment. Based on the risk indicators provided and validated by the risk assessment server 118, the client computing system 104 can determine whether to grant the access request of the entity computing system 106 to certain features of the interactive computing environment.

In a simplified example, the system depicted in FIG. 1 can configure the risk assessment server 118 to be used for accurately consolidating and validating risk assessment indicators, such as risk scores, existing resources (e.g., assets), and the like. The risk assessment server 118 can receive risk assessment data from various sources, such as the client computing system 104, the entity computing system 106, the external resource 107, etc., via a user interface provided to the entity computing system 106. The risk assessment server 118 can validate the risk assessment data using pre-existing risk assessment data 124 or other suitable data and can output the validated risk assessment data for display on the entity computing system 106, or other suitable display device, for the entity to decide whether to proceed with an interaction.

In some examples, the validated risk assessment indicators can be utilized by the service provider, for example using the client computing system 104, to determine whether the risk associated with the entity accessing a service provided by the service provider exceeds a threshold, thereby granting or denying access of the entity to an interactive computing environment implementing the service. If the service provider determines that the validated risk assessment indicators are lower than a threshold risk indicator value, then the client computing system 104 associated with the service provider can generate or otherwise provide access permission to the entity computing system 106 that requested the access. The access permission can include, for example, cryptographic keys used to generate valid access credentials or decryption keys used to decrypt access credentials. The client computing system 104 associated with the service provider can also allocate resources to the entity and provide a dedicated web address for the allocated resources to the entity computing system 106, for example, by adding the entity computing system 106 in the access permission. With the obtained access credentials or the dedicated web address, the entity computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the risk assessment server 118 and the risk data repository 122, may be instead implemented in a single device or system.

Techniques for Expediting Validation of Risk Assessment Data

Figure 2:
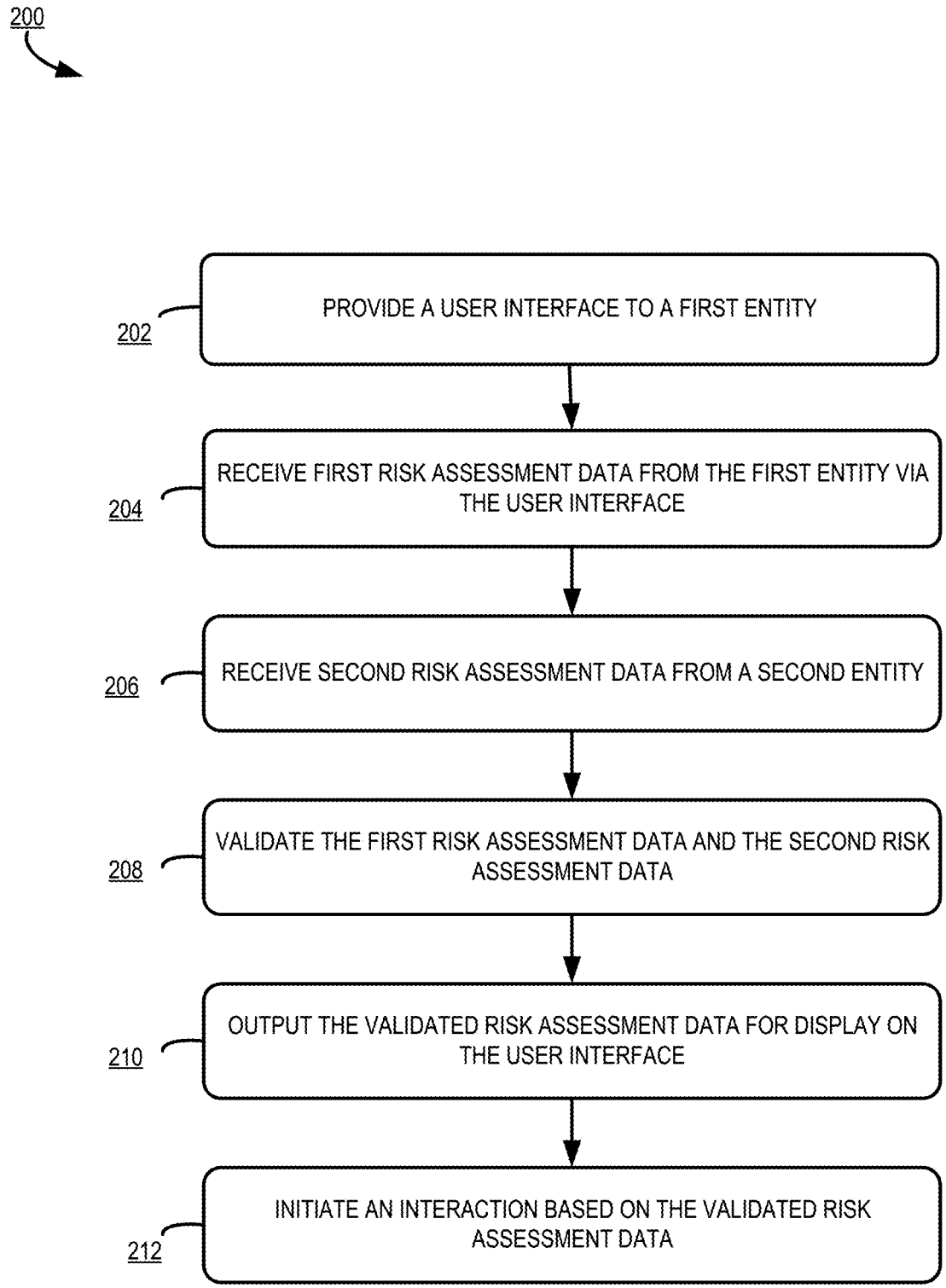
FIG. 2 is a flow chart depicting an example of a process for consolidating data sources for expediting risk assessment validation according to certain aspects of the present disclosure.

FIG. 2 is a flow chart depicting an example of a process 200 for consolidating data sources for expediting risk assessment validation according to certain aspects of the present disclosure. One or more computing devices, such as the risk assessment computing system 130, can implement operations depicted in FIG. 2 by executing suitable program code such as the risk assessment mobile application 114. For illustrative purposes, the process 200 is described with reference to certain examples depicted in the figures. Other implementations, however, are possible.

At block 202, the process 200 involves providing a user interface to a first entity, which can include an entity seeking access to web resources, or the like. In some examples, the user interface can be provided by the risk assessment server 118 or other suitable computing system. The user interface can include a set of user interface elements that can correspond to a set of risk assessment indicators. For example, a first user interface element can correspond to a first risk assessment indicator, and so on. The set of user interface elements can be configured to provide subsequent user interfaces in response to an interaction from the first entity. For example, a subsequent first user interface can be provided to the first entity in response to the entity interacting with the first user interface element, and so on. The user interface can include other suitable user interface elements and other suitable components for receiving risk assessment data.

At block 204, the process 200 involves receiving first risk assessment data from the first entity via the user interface. The first risk assessment data can include risk score information, such as a credit score, income information, debt information, asset information, authorization information, or other suitable risk assessment data provided by the first entity. The first entity can input the first risk assessment data into subsequent user interfaces provided by the risk assessment server 118. For example, the first entity can interact with the first user interface element, which can cause the first subsequent user interface to be provided to the first entity. The first subsequent user interface can guide the first entity for providing accurate and complete information for determining a first risk indicator. The risk assessment server 118 can receive, for example via the first subsequent user interface, the first risk assessment data for consolidation. The first entity can interact with the remaining user interface elements, which may include the second user interface element, the third user interface element, and any remaining user interface elements, in similar fashions for providing accurate and complete first risk assessment data. Examples of the first user interface element, the second user interface element, and the third user interface element are provided below with respect to FIG. 4.

In some examples, receiving the first risk assessment data can involve receiving information to pre-fill an application. The application can be a universal residential loan application (URLA, form 1003), an application for requisitioning online computing resources, or other suitable application associated with the first entity. The risk assessment server 118 can pre-fill the application using the received first risk assessment data and can perform other suitable operations with respect to the application. For example, the risk assessment server 118 can submit the application subsequent to completion and approval of the application by the first entity, and the like.

At block 206, the process 200 involves receiving second risk assessment data from a second entity. The second risk assessment data can include risk score information, asset data, financial records, or other suitable risk assessment data. The second entity can be or otherwise include a service-providing entity, an investment firm, or other suitable entity associated with the first entity. For example, the second entity can be a financial institution with which the first entity controls an account. In some examples, the first entity can log into an account with the second entity by providing input to a subsequent user interface provided by the risk assessment server 118. The login performed by the first entity can generate a token that can be used by the risk assessment server 118 to access the second risk assessment data. For example, the risk assessment server 118 can use the token to receive an asset report or other suitable report from the second entity. The risk assessment server 118 can parse the asset report and extract the second risk assessment data, which may include asset lists, historical bank records, and the like.

At block 208, the process 200 involves validating risk assessment data received from the first entity and the second entity. The risk assessment server 118 can validate the first risk assessment data and the second risk assessment data. For example, the risk assessment server 118 can access and receive the pre-existing risk assessment data 124. The pre-existing risk assessment data 124 can include credit scores or other risk scores, tax returns or other government records, asset reports, employment information, identification information, or other suitable risk assessment data. The risk assessment server 118 can compare the pre-existing risk assessment data 124 to the first risk assessment data and the second risk assessment data for validating at least a subset of the first risk assessment data, at least a subset of the second risk assessment data, or a combination thereof. For example, if the risk assessment server 118 determines that the first risk assessment data and the second risk assessment data are the same as, or similar within a threshold value compared to, the pre-existing risk assessment data 124, the risk assessment server 118 can validate the first risk assessment data and the second risk assessment data. Alternatively, if the risk assessment server 118 determines that the first risk assessment data or the second risk assessment data is not the same as or similar to the pre-existing risk assessment data 124, then the risk assessment server 118 may not validate the first risk assessment data and the second risk assessment data. In some examples, the risk assessment server 118 can additionally use the second risk assessment data to validate the first risk assessment data. For example, the risk assessment server 118 can compare the first risk assessment data to the second risk assessment data, and, if the first assessment data is the same as or similar to the second risk assessment data, the risk assessment server 118 may validate the first risk assessment data. The risk assessment server 118 can use other suitable techniques for validating the first risk assessment data and the second risk assessment data. Additionally, by validating risk assessment data from different sources, the risk assessment server 118, the risk assessment computing system 130, or the like can use less memory and can use memory more efficiently for validating the risk assessment data than a set of computing systems performing separate validation processes.

At block 210, the process 200 involves outputting the validated risk assessment data for display on the user interface. The risk assessment server 118 can transmit the validated first risk assessment data and the second risk assessment data to the user interface for display to the first entity or any other suitable entities. The validated risk assessment data can include a set of risk assessment indicators such as the first risk assessment indicator, etc. Each risk assessment indicator can be displayed on a separate user interface element. For example, the validated first risk assessment indicator can be displayed on the first user interface element, and so on. The first entity can view the risk assessment indicators and can decide whether to proceed with an interaction such as requesting online computing resources, requesting a loan, submitting the URLA, etc.

At block 212, the process 200 involves initiating an interaction based on the validated risk assessment data. In response to the first entity determining to continue with the interaction, the risk assessment server 118 can initiate the interaction using the validated risk assessment data. For example, the risk assessment server 118 can pre-fill an application with the validated risk assessment data and can transmit the application to a separate computing system such as the client computing system 104, etc. The separate computing system can make decisions about the first entity using the validated risk assessment data. Accordingly, by consolidating the data sources and validating the risk assessment data before initiating the interaction, the risk assessment computing system 130 can reduce an amount of computer memory used and can increase a processing speed of the separate computing system with respect to decision-making about the first entity. Additionally, the security of the validation process can be improved since the risk assessment data is consolidated and is transmitted, or otherwise handled, less often than other validation processes.

In one example, the first user interface element can correspond to a credit score or other risk score, the second user interface element can correspond to a debt-to-income ratio, and the third user interface element can correspond to assets. The entity can interact with the first user interface element to provide information usable to determine the credit score or other risk score. For example, the first entity can input identifying information, such as name, social security number, etc., into the first subsequent user interface, and the risk assessment server 118 can use the pre-existing risk assessment data 124 or other suitable information to determine the risk assessment indicator corresponding to the credit score or other risk score of the first entity. The first entity can interact with the second user interface element for inputting income and debt information. For example, a second subsequent user interface, provided in response to the first entity interacting with the second user interface element, can be configured to receive and transmit employment information, income information, and debt information to the risk assessment server 118, which can use the pre-existing risk assessment data 124 to validate and output the risk assessment indicator corresponding to the debt-to-income ratio.

The first entity can interact with the third user interface element for inputting asset information. For example, a third subsequent user interface, provided in response to the first entity interacting with the third user interface element, can be configured to receive and transmit the asset information to the risk assessment server 118. In some examples, the third subsequent user interface can allow the first entity to login to an external resource 107 for retrieving the second risk assessment data. Upon the first entity logging into the external resource 107, a token can be generated and used by the risk assessment server 118, or other suitable computing system, to retrieve the second risk assessment data from the second entity. The risk assessment server 118 can compare the second risk assessment data to the first risk assessment data for validating the first risk assessment data, and, in some examples, the risk assessment server 118 can use the pre-existing risk assessment data 124 to validate the second risk assessment data. The second risk assessment data can be used to perform various other suitable operation.

Once validated, the first risk assessment data and the second risk assessment data can be output by the risk assessment server 118. For example, the risk assessment server 118 can output the risk assessment indicators of the first entity for display on the user interface. The first entity, or other suitable entity, can view the risk assessment indicators for determining whether to proceed with an interaction. In some examples, the first entity may decide to proceed with an interaction, and, in response to this determination, the risk assessment server 118 may transmit the validated risk assessment data, and other suitable data, to a client computing system 104 for initiating the interaction.

In some examples, the risk assessment server 118 can transmit a responsive message including at least the validated first risk assessment data and the validated second risk assessment data for use in controlling access of the first entity to one or more interactive computing environments. The risk assessment server 118 can transmit the responsive message to a remote computing system such as the client computing system 104, and the like. The responsive message may cause computing resources to be allocated, or to not be allocated, to the first entity based on the validated first risk assessment data and the validated second risk assessment data. Additionally or alternatively, the responsive message may cause the interaction to be initiated.

In some examples, the risk assessment server 118 can also generate reports in required formats based on the data received from the various sources. For instance, a look-up table can be built to map the data from the sources to the corresponding fields of the reports. The risk assessment server 118 can convert the data into the required format before filling in the report. Alternatively, or additionally, a machine learning model based on document analysis techniques and/or natural language processing techniques can be built and trained to identify or categorize the data received from the sources into the types of data required by the fields in the reports. Based on the output of the machine learning model, the risk assessment server 118 can fill in the report with the identified data to generate the reports. In some examples, the machine learning model is a neural-network-based model, such as the bidirectional encoder representations from transformers (BERT) model.

Example of a Data Flow of Computing Systems Described Herein

Figure 3:
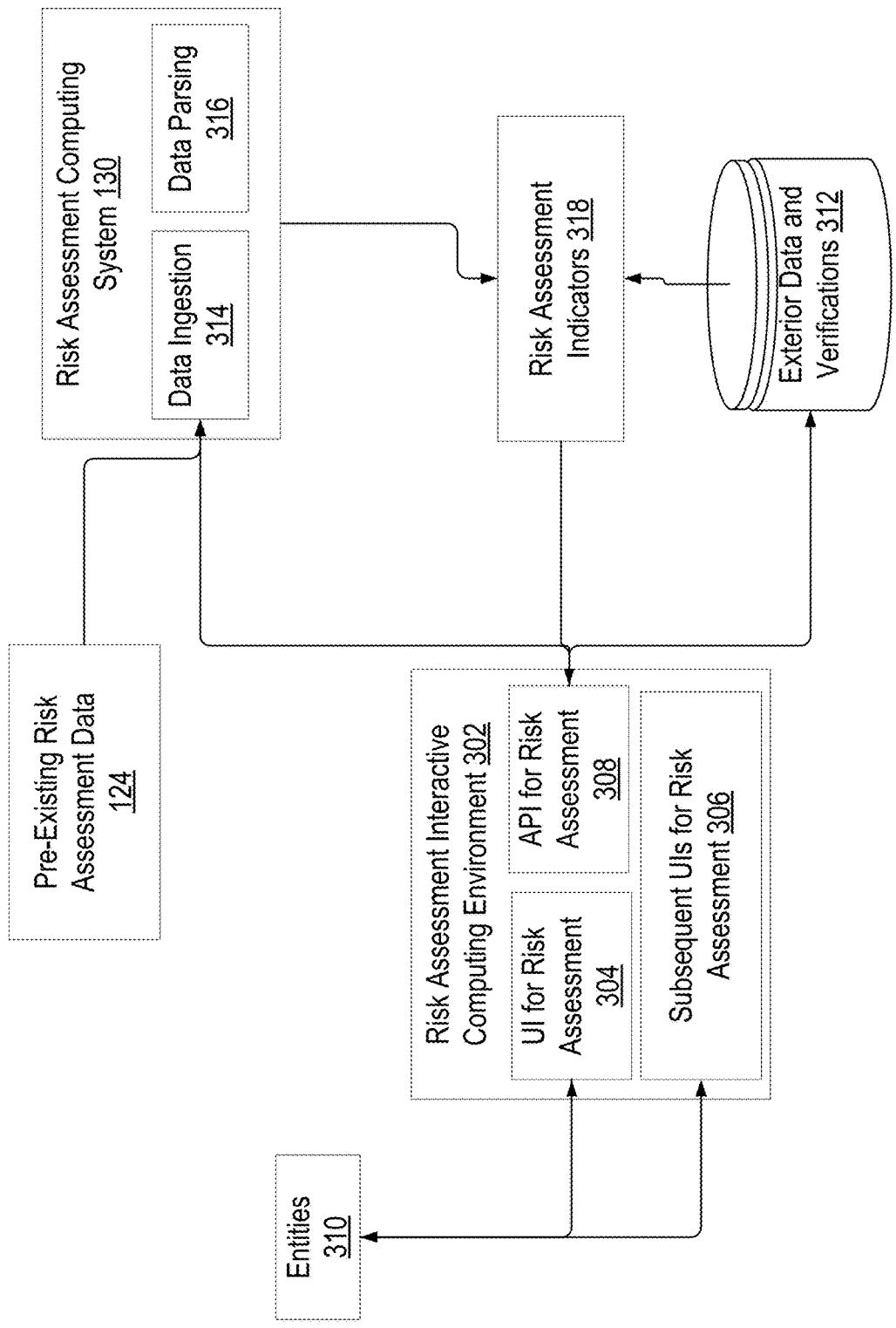
FIG. 3 is a flow diagram depicting a flow of risk assessment data in a network environment for consolidating data sources to expedite validation of the risk assessment data according to certain aspects of the present disclosure.

FIG. 3 is a flow diagram depicting a flow of risk assessment data in a network environment 300 for consolidating data sources to expedite validation of the risk assessment data according to certain aspects of the present disclosure. The network environment 300 can include the risk assessment computing system 130 and other suitable computing devices or systems. The risk assessment computing system 130 can receive pre-existing risk assessment data 124, which can include historical risk scores, employment information, income information, historical credit scores, and other suitable pre-existing risk assessment data. In some examples, the pre-existing risk assessment data 124 can be received by the risk assessment computing system 130 from third-party or other suitable exterior data sources.

The risk assessment computing system 130 can provide and can communicate with a risk assessment interactive computing environment 302. The computing environment 302 can include a user interface 304 for risk assessment, a set of subsequent user interfaces 306 for risk assessment, an API 308 for risk assessment, and other suitable components. The user interface 304 can be provided to one or more entities 310 that can provide input into the user interface 304 for accessing the subsequent user interfaces 306. The subsequent user interfaces 306 can be provided to the entities 310 for receiving risk assessment data, and other suitable data, from the entities 310 and for risk assessment.

The API 308 can make API calls between the risk assessment interactive computing environment 302 and the risk assessment computing system 130. The API 308 can make API calls between the risk assessment interactive computing environment 302 and other suitable entities. For example, the API 308 can make API calls between the computing environment 302 and exterior data and verifications 312. The exterior data and verifications 312 can be included on a computing device or system of a separate entity, such as a financial institution or other service-providing-entity, and can include validation data, additional risk assessment data, and other suitable data about the first entity. The API 308 can make an API call to the exterior data and verifications 312 to cause the computing environment 302 to receive the validation data and additional risk assessment data about the first entity. The API 308 can make an API call to the risk assessment computing system 130 to transmit the risk assessment data received from the entities 310 and from the exterior data and verifications 312 to the risk assessment computing system 130.

The risk assessment computing system 130 can receive, at a data ingestion 314 and from the API 308, the pre-existing risk assessment data 124, the risk assessment data from the entities 310, and the exterior data and verifications 312 from the separate entity. For example, the risk assessment computing system 130 can provide the risk assessment mobile application 114 or the risk assessment web application 115 to one or more of the entities 310. The data ingestion 314 can receive the data, for example from the risk assessment mobile application 114 or the risk assessment web application 115, can transmit the data within the risk assessment computing system 130 for processing, and can perform other suitable tasks relating to the received data. For example, the data ingestion 314 can transmit the received data to a data parser 316 that can parse or otherwise process the received data. The data parser 316 can receive the risk assessment data, for example from the data ingestion 314 and via the risk assessment mobile application 114 or the risk assessment web application 115, and can determine risk assessment indicators. For example, the data parser 316 can receive debt information, employment information, and income information about the first entity and can determine a debt-to-income ratio risk indicator for the first entity. The data parser 316 can determine the remaining risk indicators and can output risk assessment indicators 318. In some examples, one or more machine-learning models, for example a document-reading artificial intelligence or other suitable machine-learning model, can be applied to receive, for example via the risk assessment mobile application 114 or the risk assessment web application 115, the risk assessment data and extract the risk assessment indicators 318.

The risk assessment indicators 318 can include various risk indicators. For example, the risk assessment indicators 318 can include a risk score for the first entity, a credit score for the first entity, a debt-to-income ratio of the entity, assets required for the entity, and other suitable risk indicators relating to the entity. In some examples, the risk assessment indicators 318 can additionally include data from the exterior data and verifications 312 such as a parsed asset report from a service-providing entity, transcripts from a government institution, data relating to account integrations, and other suitable data from the exterior data and verifications 312. The risk assessment indicators 318 can be transmitted, for example via one or more API calls, to the risk assessment interactive computing environment 302 for display on the user interface 304. For example, each risk indicator of the risk assessment indicators 318 can be displayed on a corresponding user interface element of the user interface 304. The risk assessment indicators 318 can be transmitted and displayed in other suitable manners for informing the entities 310 of the risk assessment indicators 318.

Examples of a User Interface

Figure 4:
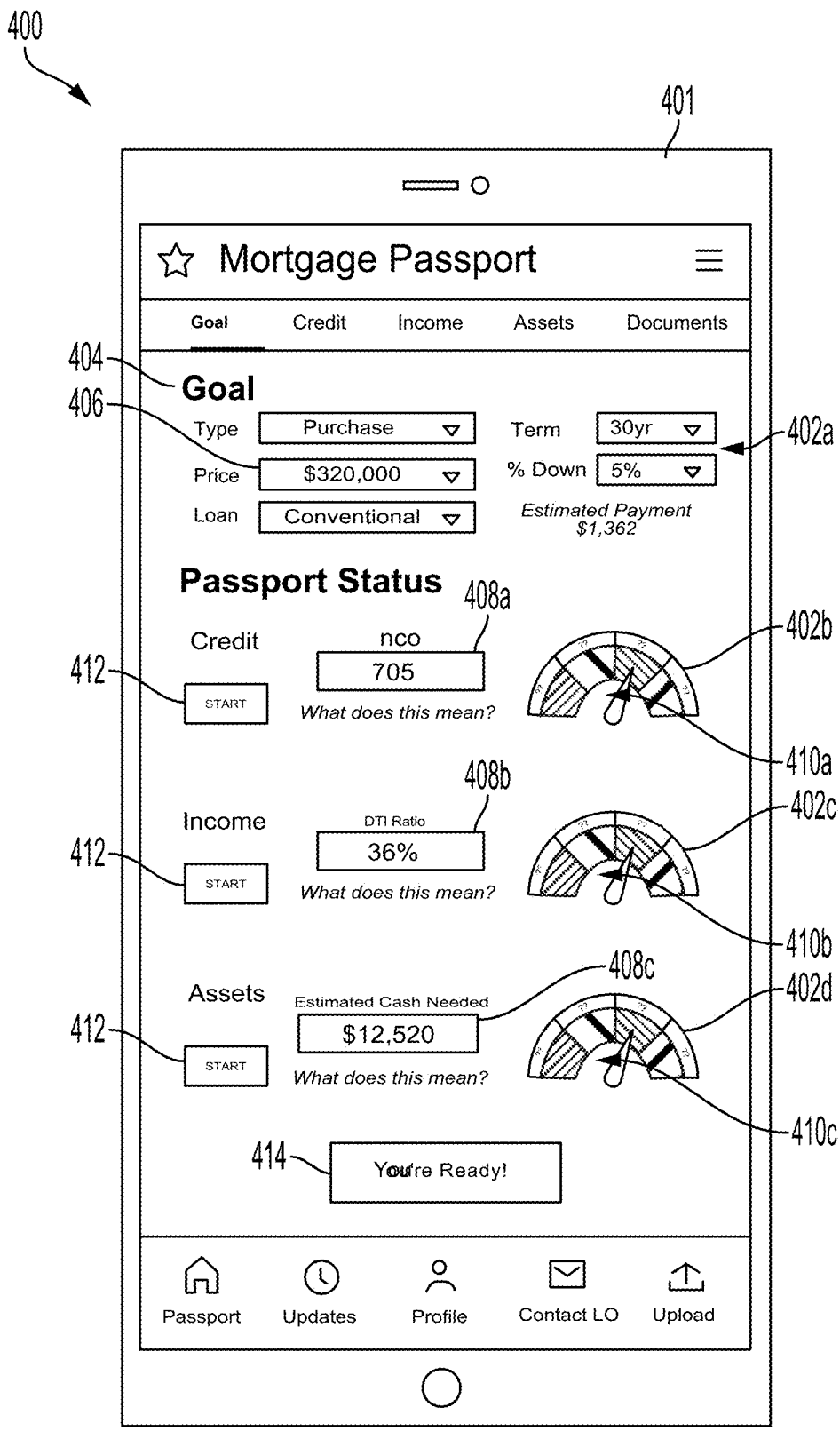
FIG. 4 shows an example of a user interface that can be used to consolidate data sources for expediting validation of risk assessment data according to certain aspects of the present disclosure.

FIG. 4 is an example of a user interface 400 that can be used to consolidate data sources for expediting validation of risk assessment data according to certain aspects of the present disclosure. The user interface 400 can include a set of user interface elements 402a-d. While four user interface elements 402a-d are illustrated on the user interface 400, other suitable amounts (e.g., less than four or more than four) of user interface elements 402 can be included on the user interface 400.

The user interface element 402a can include a title 404 and one or more input fields 406. As illustrated, the title 404 is "GOALS" and the input fields 406 relate to the goals such as a type of product, an amount, etc. The user interface element 402a can be used by the first entity to adjust the risk assessment associated with obtaining a mortgage. For example, adjusting information in the user interface element 402a can affect whether the first entity is approved or denied for a requested product or service based on the risk assessment of the first entity. The user interface element 402a can include other suitable titles and input fields 406 and can be used for any other suitable purpose with respect to the first entity.

The user interface element 402b can include a risk indicator value 408a, a risk indicator measure 410a, and an interactive button 412. The risk indicator value 408a can be or otherwise include a numeric or other suitable type of value that can represent one aspect of risk assessment with respect to the first entity. For example, the risk indicator value 408a is illustrated as a credit score, which can be used to apply for the mortgage, of the first entity, but other suitable risk indicators can be displayed as the risk indicator value 408a. The risk indicator measure 410a can be a visual representation of how good the risk indicator value 408a is. For example, a high risk score may be displayed as an arrow in the green area of the risk indicator measure 410a while a low risk score may be displayed as the arrow in the red area of the risk indicator measure 410a. Other suitable representations of the risk indicator measure 410a can be used.

The first entity or other suitable entity can interact with (e.g., click) the interactive button 412. Interacting with the interactive button 412 can cause the user interface 400 to present or otherwise provide a subsequent user interface for the first entity. The subsequent user interface can be used to input information relating to the risk indicator associated with the user interface element 402b. For example, the first entity can input information relating to the risk score in the subsequent user interface.

The user interface element 402c can include a risk indicator value 408b, a risk indicator measure 410b, and the interactive button 412. The risk indicator value 408b can be or otherwise include a numeric or other suitable type of value that can represent one aspect of risk assessment with respect to the first entity. For example, the risk indicator value 408b is illustrated as a debt-to-income ratio, which can indicate a maximum mortgage amount, of the first entity, but other suitable risk indicators can be displayed as the risk indicator value 408b. The risk indicator measure 410b can be a visual representation of how good the risk indicator value 408b is. For example, a low debt-to-income ratio may be displayed as an arrow in the green area of the risk indicator measure 410b while a high debt-to-income ratio may be displayed as the arrow in the red area of the risk indicator measure 410b. Other suitable representations of the risk indicator measure 410b can be used.

The first entity can interact with (e.g., click) the interactive button 412. Interacting with the interactive button 412 can cause the user interface 400 to present or otherwise provide a subsequent user interface for the first entity. The subsequent user interface can be used to input information relating to the risk indicator associated with the user interface element 402c. For example, the first entity can input information relating to debt information, income information, employment information, or other suitable information in the subsequent user interface.

The user interface element 402d can include a risk indicator value 408c, a risk indicator measure 410c, and an interactive button 412. The risk indicator value 408c can be or otherwise include a numeric or other suitable type of value that can represent one aspect of risk assessment with respect to the first entity. For example, the risk indicator value 408c is illustrated as assets controlled by the first entity, but other suitable risk indicators can be displayed as the risk indicator value 408c. The assets controlled by the first entity can indicate, for example, an initial resource allocation for which the first entity can qualify with respect to a mortgage. The risk indicator measure 410c can be a visual representation of how good the risk indicator value 408c is. For example, a large amount of resources of the first entity may be displayed as an arrow in the green area of the risk indicator measure 410c while a small amount of resources of the first entity may be displayed as the arrow in the red area of the risk indicator measure 410c. Other suitable representations of the risk indicator measure 410c can be used.

The first entity can interact with (e.g., click) the interactive button 412. Interacting with the interactive button 412 can cause the user interface 400 to present or otherwise provide a subsequent user interface for the first entity. The subsequent user interface can be used to input information relating to the risk indicator associated with the user interface element 402d. For example, the first entity can input information relating to the assets controlled by the first entity in the subsequent user interface. Additionally, the subsequent user interface can provide an option to login to a separate computing system to retrieve additional risk assessment data for the first entity.

Each of the user interface elements 402b-d can additionally include an option to access additional information. For example, the option can be a link, a button, or other suitable interactive field with which the first entity can interact. The option can display information to the first entity, and the information can be related to the associated risk assessment indicator. For example, interacting with the option on the user interface element 402b may provide more information relating to the risk score, for example what it means, how to improve the risk score, etc. Interacting with the option on the other user interface elements 402c-d can provide similar information about the debt-to-income ratio and the assets risk indicators.

The user interface 400 can additionally include a display 414 that can indicate whether the risk assessment of the first entity is adequately complete. For example, as illustrated on the user interface 400, the display 414 indicates that the first entity is ready to submit the risk assessment indicators for requesting a product or service. Alternatively, the display 414 can display other suitable values such as "NOT READY" or other suitable display values. In some examples, the display 414 can be interactive. For example, the consumer can interact with the display 414, when prompted, to submit the risk assessment data.

Figure 5:
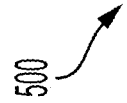
FIG. 5 shows an example of a subsequent user interface that can be used to receive risk assessment data to consolidate data sources for expediting validation of risk assessment data according to certain aspects of the present disclosure.

FIG. 5 is an example of a subsequent user interface 500 that can be used to receive risk assessment data to consolidate data sources for expediting validation of risk assessment data according to certain aspects of the present disclosure. The subsequent user interface 500 can include various fields and information for guiding the first entity to provide accurate and complete information for determining risk indicators. In some examples, the subsequent user interface 500, or any derivative thereof, can be accessed in response to interacting with the interactive button 412 of the user interface 400.

As illustrated, the subsequent user interface 500 is an example of a user interface for gathering information relating to a risk score of the first entity. The subsequent user interface 500 can include a title 502, a name field 504, identifying information fields 506, an authorization field 508, and a submission button 510. The title 502 can display information indicating a type of information contained within the subsequent user interface 500 to a user of the subsequent user interface 500. For example, as illustrated, the title 502 is "CREDIT INTERVIEW," which indicates that the subsequent user interface 500 relates to credit score information.

The name field 504 can be completed by the first entity. For example, the first entity can input their name into the name field 504 for allowing the risk assessment computing system 130 to determine a risk score of the first entity. Additionally, the first entity can input identifying information into the identifying information fields 506 for allowing the risk assessment computing system 130 to determine the risk score. The identifying information fields 506 can include a social security number, a date of birth, an address, and other suitable fields for receiving identifying information.

Upon completion of the subsequent user interface 500, the first entity may provide an authorization via the subsequent user interface 500. For example, the first entity can interact with the authorization field 508 for indicating that the first entity believes the information input into the subsequent user interface 500 is accurate and complete. In some examples, the authorization indicator can include a simple checkbox, a signature field, or other suitable authorization indicators. In response to providing the authorization, the first entity may interact with the submission button 510. By interacting with the submission button 510, the first entity may cause the information input into the subsequent user interface 500 to be transmitted to the risk assessment computing system 130 for determining corresponding risk assessment indicators.

While the subsequent user interface 500 is illustrated for a credit interview for determining a credit score, other suitable risk indicators can be determined using information from various different subsequent user interfaces. For example, the subsequent user interface 500, instead of a credit interview, can include an employment, income, or debt interview, an asset interview, an identity interview, or other suitable types of subsequent user interfaces 500. Each risk indicator used or otherwise determined by the risk assessment computing system 130 can have a corresponding subsequent user interface 500 for allowing the first entity to provide associated risk assessment data.

Example of Computing System

Figure 6:
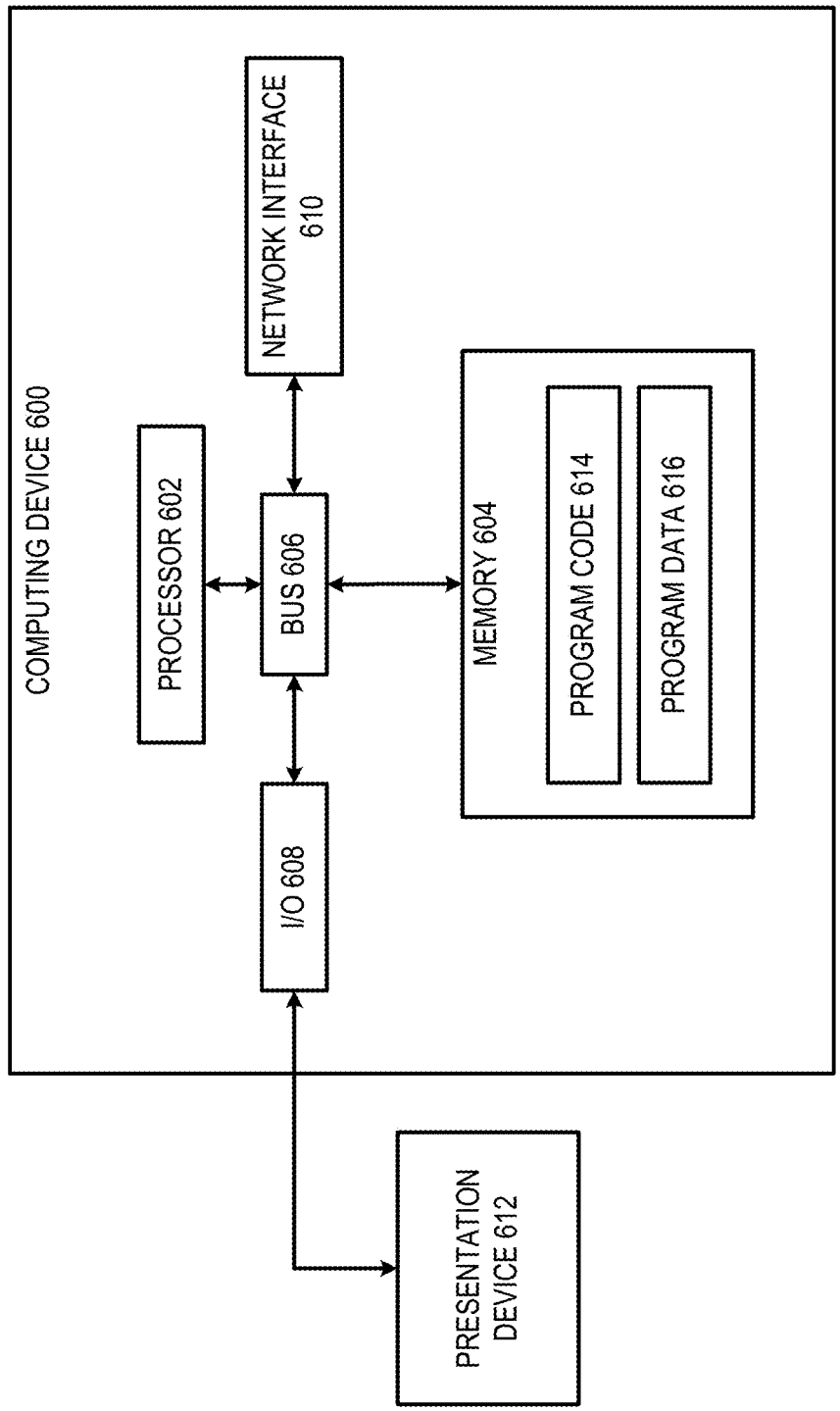
FIG. 6 is a block diagram depicting an example of a computing system suitable for implementing certain aspects of the present disclosure.

Any suitable computing system or group of computing systems can be used to perform the operations for the risk assessment operations described herein. For example, FIG. 6 is a block diagram depicting an example of a computing device 600, which can be used to implement the risk assessment server 118 or other suitable components of the operating environment 100. The computing device 600 can include various devices for communicating with other devices in the operating environment 100, as described with respect to FIG. 1. The computing device 600 can include various devices for performing one or more data consolidation operations, data validation operations, or other suitable operations described above with respect to FIGS. 1-5.

The computing device 600 can include a processor 602 that is communicatively coupled to a memory 604. The processor 602 can execute computer-executable program code stored in the memory 604, can access information stored in the memory 604, or a combination thereof. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 602 can include a microprocessor, an application-specific integrated circuit (ASIC), a field-programmable gate array (FPGA), or any other suitable processing device. The processor 602 can include any suitable number of processing devices, including one. The processor 602 can include or communicate with a memory 604. The memory 604 can store program code that, when executed by the processor 602, causes the processor 602 to perform the operations described herein.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C #, Visual Basic, Java, Python, Perl, JavaScript, ActionScript, etc.

The computing device 600 may also include a number of external or internal devices such as input or output devices. For example, the computing device 600 is illustrated with an input/output interface 608 that can receive input from input devices or provide output to output devices. A bus 606 can also be included in the computing device 600. The bus 606 can communicatively couple one or more components of the computing device 600.

The computing device 600 can execute program code 614 that can include the risk assessment mobile application 114. The program code 614 for the risk assessment mobile application 114 may be resident in any suitable computer-readable medium and may be executed on any suitable processing device. For example, as depicted in FIG. 6, the program code 614 for the risk assessment mobile application 114 can reside in the memory 604 at the computing device 600 along with the program data 616 associated with the program code 614, such as the pre-existing risk assessment data 124. Executing the risk assessment mobile application 114 can configure the processor 602 to perform the operations described herein.

In some aspects, the computing device 600 can include one or more output devices. One example of an output device can be the network interface device 610 depicted in FIG. 6. A network interface device 610 can include any device or group of devices suitable for establishing a wired or wireless data connection to one or more data networks described herein. Non-limiting examples of the network interface device 610 can include an Ethernet network adapter, a modem, etc.

Another example of an output device can include the presentation device 612 depicted in FIG. 6. A presentation device 612 can include any device or group of devices suitable for providing visual, auditory, or other suitable sensory output. Non-limiting examples of the presentation device 612 can include a touchscreen, a monitor, a speaker, a separate mobile computing device, etc. In some aspects, the presentation device 612 can include a remote client-computing device that communicates with the computing device 600 using one or more data networks described herein. In other aspects, the presentation device 612 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method that includes one or more processing devices performing operations comprising:
providing, from a risk assessment computing system, a user interface to a first entity, the user interface comprising a plurality of user interface elements corresponding to a plurality of risk assessment indicators, the plurality of user interface elements configured to receive first risk assessment data corresponding to at least a subset of the plurality of risk assessment indicators;
receiving, via the user interface, and at the risk assessment computing system, the first risk assessment data that is associated with the first entity;
generating a digital token in response to the first entity performing an interaction via the user interface;
using the digital token to access second risk assessment data that is associated with the first entity, wherein the second risk assessment data is provided to the risk assessment computing system by a second, digitally secured entity;

consolidating, at the risk assessment computing system, the first risk assessment data and the second risk assessment data;
validating, by the risk assessment computing system and during the same validation process, the first risk assessment data and the second risk assessment data, wherein the validation process comprises:
  comparing the first risk assessment data received via the user interface and the second risk assessment data received via the second, digitally secured entity based on predefined validation rules specific to a type and source of the respective data;
  identifying, based on the comparison, one or more discrepancies between the first risk assessment data and the second risk assessment data; and
  resolving the one or more discrepancies between the first risk assessment data and the second risk assessment data to generate a validated first risk assessment data and a validated second risk assessment data;
outputting the validated first risk assessment data and the validated second risk assessment data for display on the user interface;
transmitting, to a remote computing device, a responsive message including at least the validated first risk assessment data and the validated second risk assessment data; and
controlling access of the first entity to one or more interactive computing environments using at least the responsive message.

2. The method of claim 1, wherein the interaction performed by the first entity comprises providing login information to the user interface.

3. The method of claim 1, wherein receiving the first risk assessment data via the user interface comprises receiving input from the first entity for causing a subsequent user interface to be provided to the first entity for receiving additional first risk assessment data.

4. The method of claim 3, wherein the subsequent user interface comprises a subsequent plurality of user interface elements usable by the first entity to cause the additional first risk assessment data to be received.

5. The method of claim 1, wherein transmitting the responsive message comprises initiating an interaction using the validated first risk assessment data and the validated second risk assessment data, wherein the interaction includes a request by the first entity for access to one or more computing resources.

6. The method of claim 1, wherein validating the first risk assessment data and the second risk assessment data comprises:
  determining that the first risk assessment data matches the second risk assessment data; and
  determining, based on the first risk assessment data matching the second risk assessment data, that the first risk assessment data and the second risk assessment data are valid.

7. The method of claim 1, wherein validating the first risk assessment data and the second risk assessment data comprises:
  determining that the first risk assessment data and the second risk assessment data match third-party risk assessment data; and
  determining, based on the first risk assessment data and the second risk assessment data matching the third-party risk assessment data, that the first risk assessment data and the second risk assessment data are valid.

8. A system comprising:
a processor; and
a non-transitory computer-readable medium comprising instructions that are executable by the processor to cause the processor to perform operations comprising:
  providing a user interface to a first entity, the user interface comprising a plurality of user interface elements corresponding to a plurality of risk assessment indicators;
  receiving, via the user interface, first risk assessment data that is associated with the first entity;
  generating a digital token in response to the first entity performing an interaction via the user interface;
  using the digital token to access second risk assessment data that is associated with the first entity, wherein the second risk assessment data is provided to the risk assessment computing system by a second, digitally secured entity;
  validating the first risk assessment data and the second risk assessment data during the same validation process, wherein the validation process comprises;
    comparing the first risk assessment data received via the user interface and the second risk assessment data received via the second, digitally secured entity based on predefined validation rules specific to a type and source of the respective data;
    identifying, based on the comparison, one or more discrepancies between the first risk assessment data and the second risk assessment data; and
    resolving the one or more discrepancies between the first risk assessment data and the second risk assessment data to generate a validated first risk assessment data and a validated second risk assessment data;
  outputting the first risk assessment data and the second risk assessment data for display on the user interface; and
  transmitting, to a remote computing device, a responsive message including at least the validated first risk assessment data and the validated second risk assessment data; and
  controlling access of the first entity to one or more interactive computing environments using at least the responsive message.

9. The system of claim 8, wherein the interaction performed by the first entity comprises providing login information to the user interface.

10. The system of claim 8, wherein the operation of receiving the first risk assessment data via the user interface comprises receiving input from the first entity for causing a subsequent user interface to be provided to the first entity for receiving additional first risk assessment data.

11. The system of claim 10, wherein the subsequent user interface comprises a subsequent plurality of user interface elements usable by the first entity to cause the additional first risk assessment data to be received.

12. The system of claim 8, wherein the operation of transmitting the responsive message comprises initiating an interaction using the validated first risk assessment data and the validated second risk assessment data, wherein the interaction includes a request by the first entity for access to one or more computing resources.

13. The system of claim 8, wherein the operation of validating the first risk assessment data and the second risk assessment data comprises:
  determining that the first risk assessment data matches the second risk assessment data; and determining, based on the first risk assessment data matching the second risk assessment data, that the first risk assessment data and the second risk assessment data are valid.

14. The system of claim 8, wherein the operation of validating the first risk assessment data and the second risk assessment data comprises:
   determining that the first risk assessment data and the second risk assessment data match third-party risk assessment data; and
   determining, based on the first risk assessment data and the second risk assessment data matching the third-party risk assessment data, that the first risk assessment data and the second risk assessment data are valid.

15. A non-transitory computer-readable medium comprising instructions that are executable by a processing device for causing the processing device to perform operations comprising:
   providing a user interface to a first entity, the user interface comprising a plurality of user interface elements corresponding to a plurality of risk assessment indicators;
   receiving, via the user interface, first risk assessment data that is associated with the first entity;
   generating a digital token in response to the first entity performing an interaction via the user interface;
   using the digital token to access second risk assessment data that is associated with the first entity, wherein the second risk assessment data is provided to the risk assessment computing system by a second, digitally secured entity;
   validating the first risk assessment data and the second risk assessment data during the same validation process, wherein the validation process includes:
      comparing the first risk assessment data received via the user interface and the second risk assessment data received via the second, digitally secured entity based on predefined validation rules specific to a type and source of the respective data;
      identifying, based on the comparison, one or more discrepancies between the first risk assessment data and the second risk assessment data; and
      resolving the one or more discrepancies between the first risk assessment data and the second risk assessment data to generate a validated first risk assessment data and a validated second risk assessment data;
   outputting the first risk assessment data and the second risk assessment data for display on the user interface;
   transmitting, to a remote computing device, a responsive message including at least the validated first risk assessment data and the validated second risk assessment data; and
   controlling access of the first entity to one or more interactive computing environments using at least the responsive message.

16. The non-transitory computer-readable medium of claim 15, wherein interaction performed by the first entity comprises providing login information to the user interface.

17. The non-transitory computer-readable medium of claim 15, wherein the operation of receiving the first risk assessment data via the user interface comprises receiving input from the first entity for causing a subsequent user interface to be provided to the first entity, and wherein the subsequent user interface comprises a subsequent plurality of user interface elements usable by the first entity to cause the first risk assessment data to be received.

18. The non-transitory computer-readable medium of claim 15, wherein the operation of transmitting the responsive message comprises initiating an interaction using the validated first risk assessment data and the validated second risk assessment data, wherein the interaction includes a request by the first entity for access to one or more computing resources.

19. The non-transitory computer-readable medium of claim 15, wherein the operation of validating the first risk assessment data and the second risk assessment data comprises:
   determining that the first risk assessment data matches the second risk assessment data; and
   determining, based on the first risk assessment data matching the second risk assessment data, that the first risk assessment data and the second risk assessment data are valid.

20. The non-transitory computer-readable medium of claim 15, wherein the operation of validating the first risk assessment data and the second risk assessment data comprises:
   determining that the first risk assessment data and the second risk assessment data match third-party risk assessment data; and
   determining, based on the first risk assessment data and the second risk assessment data matching the third-party risk assessment data, that the first risk assessment data and the second risk assessment data are valid.

* * * * *